No. 657,373. Patented Sept. 4, 1900.
S. H. WILLIAMS.
PEA THRESHER AND CLEANER.
(Application filed July 15, 1899.)

(No Model.)

WITNESSES:

INVENTOR
Samuel H. Williams
BY
ATTORNEYS

UNITED STATES PATENT OFFICE.

SAMUEL H. WILLIAMS, OF BARNARDSVILLE, TENNESSEE.

PEA THRESHER AND CLEANER.

SPECIFICATION forming part of Letters Patent No. 657,373, dated September 4, 1900.

Application filed July 15, 1899. Serial No. 723,887. (No model.)

*To all whom it may concern:*

Be it known that I, SAMUEL H. WILLIAMS, of Barnardsville, in the county of Roane and State of Tennessee, have invented a new and Improved Pea Thresher and Cleaner, of which the following is a full, clear, and exact description.

One object of my invention is to provide a machine capable of threshing peas on the vine just as they are mowed and raked in the field and also to clean the peas with little waste, breakage, or laceration.

A further object of the invention is to so construct the machine that one portion of the concave will be adapted especially for cutting the pods from the vines and the other portion for threshing the peas from the pods.

Another object of the invention is to provide a means whereby any pods that may pass through the machine without having the peas removed from them will be automatically returned to a portion of the concave and cylinder especially adapted to complete the threshing operation.

Another object of the invention is to provide a complete separation of the vines from the unthreshed pods and shelled peas and the shelled peas from the pods after the vines, peas, and pods have passed between the concave and cylinder.

The invention consists in the novel construction and combination of the several parts, as will be hereinafter fully set forth, and pointed out in claims.

Reference is to be had to the accompanying drawings, forming a part of this specification, in which similar characters of reference indicate corresponding parts in both figures.

Figure 1:
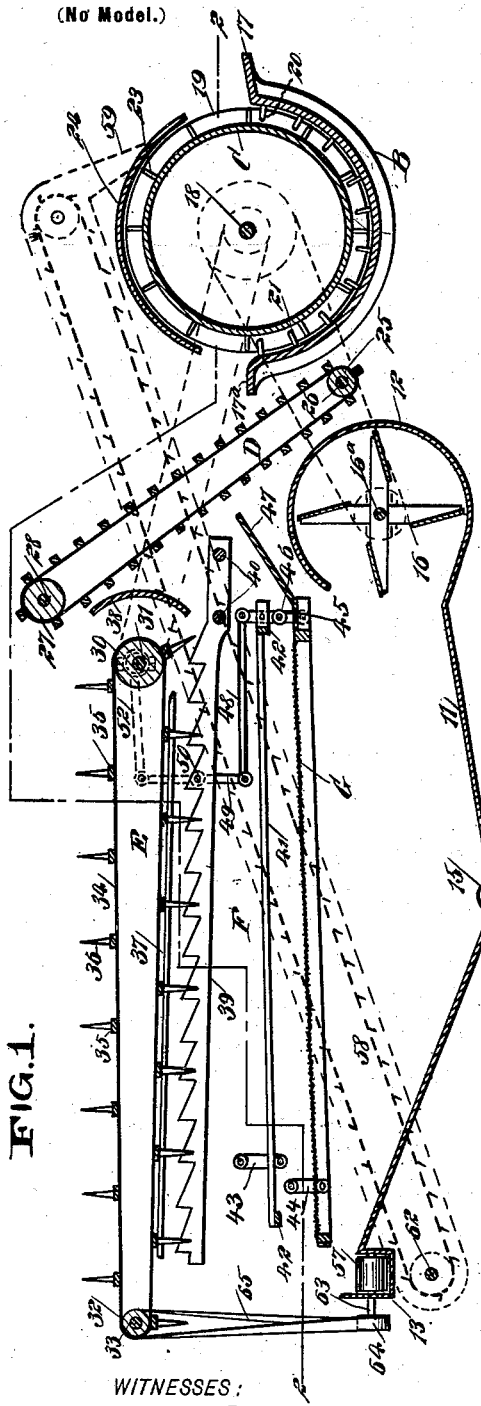
Figure 2:
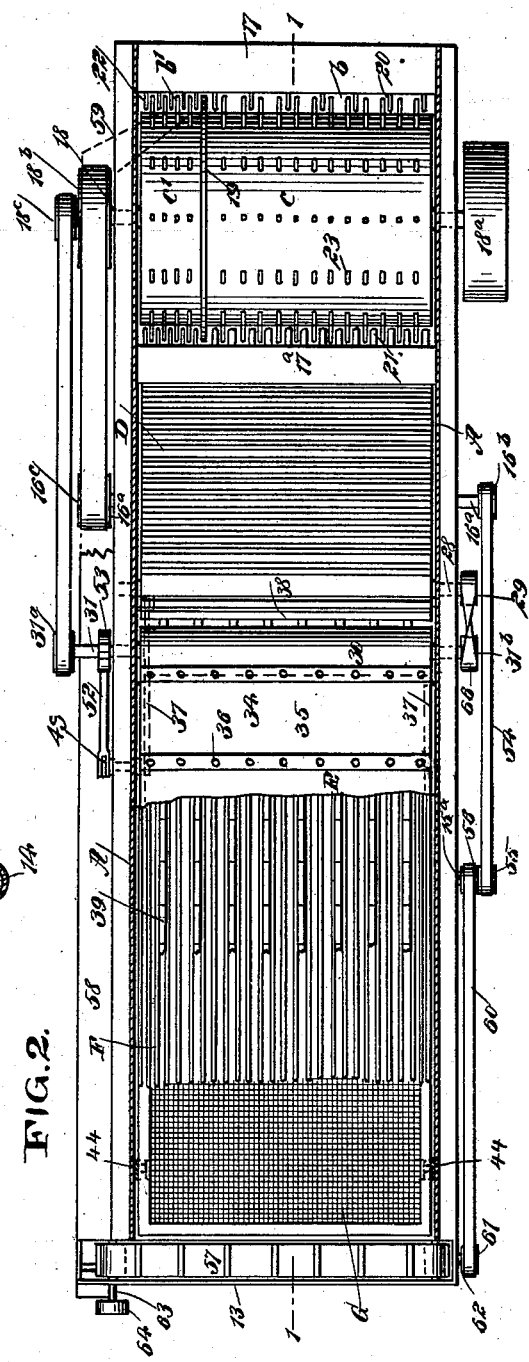

Figure 1 is a longitudinal vertical section through the machine, the section being taken substantially on the line 1 1 of Fig. 2; and Fig. 2 is a horizontal section taken practically on the line 2 2 of Fig. 1, the cylinder appearing in plan view.

The frame A of the machine consists of two sides, a top, if desired, and a partial bottom 11, that extends from the back to a point near the front, and said bottom at its forward end is curved to form a semicircular chamber 12, while at the rear end of the bottom a transverse trough 13 is constructed. The bottom 11, between the chamber 12 and trough 13, inclines downwardly to its center, at which point another transverse trough 14 is made, and in this trough a screw conveyer 15 is mounted to revolve, adapted to conduct the shelled peas from the machine.

A fan 16 is located in the chamber 12, said fan being mounted upon a suitable shaft $16^a$, which shaft extends through the sides of the machine, being provided with a pulley $16^b$ at one end and a pulley $16^c$ at the opposite end. The concave B is located in front of the fan-casing 12 and is suitably supported in the frame, and the said concave is provided at its forward upper end with a rearwardly and downwardly inclined table 17 and at its opposite end with a second table $17^a$, that is slightly upwardly and rearwardly inclined. The cylinder C is mounted to revolve above the concave in the usual manner, and the said cylinder is mounted upon a shaft 18, that extends through the sides of the frame. Said shaft 18 is provided with a driving-pulley $18^a$ at one end and with a large and a small pulley $18^b$ and $18^c$ at its opposite end. The cylinder is divided into two sections $c$ and $c'$ by an annular partition 19, the division $c'$ being much smaller than the division $c$, and the same partition 19 makes a corresponding division in the concave, the larger division being designated as $b$ and the smaller division as $b'$. The first row of teeth 20 in the front of the concave at the division $b$ have sharp or cutting edges, being adapted to sever the pods from the vines; but the other teeth 21 are plain, much larger, and are placed closer together, as illustrated in Fig. 2. The teeth 22 in the division $b'$ of the concave are all of like character and are preferably thinner than the teeth 21; but the teeth 23 of the cylinder are all alike. The top of the cylinder is closed by a suitable hood 24.

The vines with the pods attached are fed to the concave and cylinder at the divisions $c$ and $b$ and, as stated, the pods are cut from the vines as the vines enter the space between the cylinder and the concave, and the plain teeth of the cylinder and concave serve to thresh the peas from the pods. The pods, threshed peas, and vines pass rearward over the table $17^a$ of the concave to an elevator D, that is given an upward and rearward inclination. This elevator consists usually of an endless canvas having slats upon its outer face, which canvas is passed over a lower drum 25, mounted on a suitable shaft 26, and the upper portion of the endless canvas is passed over a larger drum 27, mounted on a shaft 28, which shaft 28 extends through one side of the frame, as shown in Fig. 2, and is provided with an attached pulley 29.

A horizontal separator E is located at the rear of the upper portion of the elevator D. This separator is in the nature of a conveyer comprising a forward roller 30, mounted on a suitable shaft 31, that extends through the frame and is provided at one end with a pulley 31$^a$ and at the opposite end with a pulley 31$^b$ and a smaller drum 32, which is at the rear of the machine and mounted upon a suitable shaft 33. An endless canvas 34 is carried by these rollers or drums 30 and 32, and the canvas 34 is provided with transverse slats 35 upon its outer face, and said slats carry teeth 36. The lower stretch of the canvas and attached slats 35 is supported by suitable guide-rails 37. A curved partition 38 is located between the elevator D and the forward end of the separator E, the concaved surface of the partition facing rearward, as shown in Fig. 1. Below this partition 38 and the traveling separator E a series of slats 39 is horizontally located, the slats being properly connected at their forward ends and secured in position in the frame below the partition 38. Each slat is provided with a series of teeth upon its upper surface, the teeth having a rearward inclination, and the paths of the lower teeth on the traveling separator are between the toothed slats 39.

The vines, shelled peas, and pods when delivered by the elevator D fall upon the series of toothed slats 39, which may be termed a "toothed" grate, and the teeth of the traveling separator when passing between the bars or slats of this grate separate the vines from the pods and shelled peas, causing the pods and peas to fall through the spaces between the grate-bars, while the vines are conducted rearward upon the grate-bars and delivered at the end of the machine. The peas and pods when they drop from the grate fall upon a screen F, which screen F consists of a series of connected bars or slats preferably made of wood and connected at both of their ends by means of cross-bars 42. The individual bars of the screen are designated as 41, and the rear of the screen F is suspended by hangers 43, pivoted to the sides of the casing. The pods from which the peas have not been shelled cannot pass through the spaces between the bars of said screen, but the peas and partially-threshed pods will fall upon a sieve G, below the screen F, which sieve at its rear end is supported by pivoted hangers 44, corresponding to the hangers 43. The forward cross-bar of the screen and the forward end of the sieve G are attached to a lever 45 at opposite sides of its pivot 46, since both the screen and the sieve are adapted to have end movement. The sieve is provided with a forwardly and upwardly extending plate 47, that receives any peas that may drop downward as the bulk of the material is being fed to the grate bars or slats 39.

The reciprocation of the sieve and screen is accomplished in any desired manner. As shown, however, a connecting rod or link 48 is attached to the upper end of the lever 45, the other end of the link being pivotally attached to the lower end of a lever 49, pivoted at 50, the upper end of the lever 49 being connected by means of a pitman 52 with an eccentric 53, mounted on the driving-shaft 31 of the traveling separator.

The shelled peas drop through the screen G into the chamber below said screen, where they are subjected to the action of the fan and cleaned, and the cleaned peas are received by the screw conveyer 15 and conducted out to one side of the machine; but the partially-threshed peas and those pods that have not been threshed out are delivered by the reciprocating screen and sieve upon a conveyer 57, located in the trough 13 at the rear of the machine, and this transverse conveyer 57 delivers the material carried thereby into the bottom portion of the elevator 58, located at one side of the machine, which elevator is provided with a spout 59 at its forward upper end, and this spout delivers the material to the divisions $b'$ and $c'$ of the cylinder and concave, where the threshing operation is completed.

The screw conveyer 15 is driven by a belt 54, carried over the pulley 16$^b$ of the fan-shaft 16$^a$ to a pulley 55, mounted on the shaft 15$^a$ of the screw conveyer 15, as shown in Fig. 2, and this shaft 15$^a$ also carries a second pulley 56. This latter pulley is connected by a belt 60 with a pulley 61, located on the lower driving-shaft 62 of the elevator 58. The conveyer 57 is driven by carrying a shaft 63 from one of its supports rearward, to which shaft a pulley 64 is secured, and this pulley 64 is connected by a cross-belt 65 with a pulley on the rear shaft 33 of the traveling separator.

The traveling separator is driven by a cross-belt 66, that is passed over the pulley 31$^b$ on the driving-shaft 31 of the said separator and over the pulley 29, located on the driving-shaft 28 of the forward elevator D. Thus it will be seen that the vines are separated from the pods, the vines are cut, the pods are threshed, the pods, vines, and shelled peas are then delivered to the grate, and the vines are carried along the grate out from the machine by the traveling separator, while the peas and pods fall through the spaces between the grate-bars upon a reciprocating screen and sieve, from which the peas drop to a suitable conveyer, while the unthreshed or partially-threshed pods are delivered from the screen and sieve to a conveyer and elevator that reconducts them to the concave and cylinder.

Having thus described my invention, I claim as new and desire to secure by Letters Patent—

1. In a pea thresher and cleaner, a concave and cylinder constructed in two unequal divisions, the larger division of the concave being provided with a front row of cutting-teeth for cutting the pea-vines and separating them from the pods, the remaining teeth being threshing-teeth to thresh the pods, the smaller division of the concave being provided with threshing-teeth only, the teeth of the smaller division of the concave being thinner and arranged closer together than the teeth of the larger division, a separating device to which the material is delivered to separate the vines from the shelled peas and pods, and remove the vines from the machine, and means for returning the unthreshed or partially-threshed pods to the smaller division of the concave, substantially as described.

2. In a pea thresher and cleaner, a threshing device, an elevator arranged to receive material from the threshing device, a fixed toothed grate located at the rear of the elevator, a traveling toothed separator located at the rear of the upper portion of the elevator and above the toothed grate, horizontally-extending guide-rails located between the toothed grate and the traveling separator for supporting the latter, the teeth of the separator passing between the guide-rails and between the toothed slats or bars of the grate, a curved partition located between the elevator and the forward end of the separator and above the forward end of the toothed grate, the concaved surface of the partition facing rearward, a reciprocating screen and sieve located beneath the grate, a conveyer for the shelled peas, a fan arranged to direct currents of air upon the falling shelled peas, and a conveyer for the material that will not pass through said screen and sieve, substantially as described.

3. In a pea thresher and cleaner, a cylinder and concave, an elevator arranged to receive material from the cylinder and concave, fixed toothed slats or bars located at the rear of the elevator and adapted to receive material therefrom, a traveling toothed separator acting in conjunction with the toothed slats, and a screening device located beneath the said toothed slats and comprising a screen consisting of slats or bars connected at their ends by cross-bars, and a sieve located beneath the screen, the said screen and sieve being supported at their rear ends by pivoted hangers, a lever fulcrumed at a point between the forward ends of the sieve and screen and attached at opposite sides of its pivot to said ends, the upper end of said lever extending above the screen, an eccentric actuated by a moving part of the machine, and connections between the eccentric and the upper end of said lever, substantially as described.

SAMUEL H. WILLIAMS.

Witnesses:
C. T. RIDDLE,
H. N. BAINYER.